(12) United States Patent
Wada et al.

(10) Patent No.: US 8,311,977 B2
(45) Date of Patent: Nov. 13, 2012

(54) INFORMATION PROCESSING APPARATUS

(75) Inventors: Yuji Wada, Kawasaki (JP); Akira Katsuno, Kawasaki (JP); Yasuhide Matsumoto, Kawasaki (JP); Masazumi Matsubara, Kawasaki (JP); Kuniaki Shimada, Kawasaki (JP); Yukihiro Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 457 days.

(21) Appl. No.: 12/397,927

(22) Filed: Mar. 4, 2009

(65) Prior Publication Data
US 2009/0228506 A1 Sep. 10, 2009

(30) Foreign Application Priority Data
Mar. 10, 2008 (JP) .................... 2008-059425

(51) Int. Cl.
G06F 7/00 (2006.01)
G06F 17/00 (2006.01)
(52) U.S. Cl. .................. 707/609; 707/687; 707/812
(58) Field of Classification Search ............. 707/609, 707/687–688, 812
See application file for complete search history.

(56) References Cited

U.S. PATENT DOCUMENTS

| | | | |
|---|---|---|---|
| 5,440,738 A | 8/1995 | Bowman et al. | |
| 6,205,478 B1 * | 3/2001 | Sugano et al. | 709/223 |
| 6,675,149 B1 * | 1/2004 | Ruffin et al. | 705/7.12 |
| 6,766,318 B1 * | 7/2004 | Guay et al. | 707/688 |
| 7,181,471 B1 * | 2/2007 | Ibuki et al. | 1/1 |
| 7,360,219 B2 * | 4/2008 | Rhine | 718/104 |
| 7,409,586 B1 * | 8/2008 | Bezbaruah et al. | 714/13 |
| 7,570,587 B1 * | 8/2009 | Wilson et al. | 370/230 |
| 7,730,342 B2 * | 6/2010 | Hirano et al. | 714/4.1 |
| 8,082,222 B2 * | 12/2011 | Rangarajan et al. | 707/609 |
| 8,112,758 B2 * | 2/2012 | Jain et al. | 718/104 |
| 2003/0140087 A1 * | 7/2003 | Lincoln et al. | 709/201 |
| 2004/0153435 A1 * | 8/2004 | Gudbjartsson et al. | 707/1 |
| 2004/0179528 A1 * | 9/2004 | Powers et al. | 370/392 |
| 2005/0172162 A1 * | 8/2005 | Takahashi et al. | 714/4 |
| 2006/0174132 A1 * | 8/2006 | Owen et al. | 713/182 |
| 2006/0288413 A1 * | 12/2006 | Kubota | 726/23 |
| 2007/0038587 A1 * | 2/2007 | Watanabe et al. | 706/21 |
| 2007/0112769 A1 * | 5/2007 | Takeuchi | 707/7 |
| 2007/0174346 A1 * | 7/2007 | Brown et al. | 707/200 |
| 2007/0200908 A1 * | 8/2007 | Kin et al. | 347/140 |
| 2007/0203952 A1 * | 8/2007 | Baron et al. | 707/200 |
| 2007/0282856 A1 * | 12/2007 | Mueller et al. | 707/10 |
| 2007/0283206 A1 * | 12/2007 | Kitajima et al. | 714/746 |
| 2008/0114770 A1 * | 5/2008 | Chen et al. | 707/10 |
| 2008/0114870 A1 * | 5/2008 | Pu | 709/224 |

(Continued)

FOREIGN PATENT DOCUMENTS

JP    A 2006-318371    11/2006

(Continued)

Primary Examiner — Wilson Lee
Assistant Examiner — Jessica N Le
(74) Attorney, Agent, or Firm — Greer, Burns & Crain, Ltd.

(57) ABSTRACT

An information processing apparatus for managing attribute information as to resources constituting a system includes an acquisition unit which obtains a plurality of attribute information as to the same resources, a degree of reliability calculation unit which calculates, when a contradiction exists between the plurality of attribute information obtained by the acquisition unit, a degree of reliability as to each of the plurality of attribute information, and an attribute information determination unit which sets the attribute information, which has the highest degree of reliability calculated by the degree of reliability calculation unit, as attribute information as to the resources.

17 Claims, 18 Drawing Sheets

U.S. PATENT DOCUMENTS

| | | |
|---|---|---|
| 2008/0177688 A1* | 7/2008 | Friedlander et al. ............ 706/46 |
| 2008/0183690 A1* | 7/2008 | Ramachandran ................. 707/5 |
| 2008/0201381 A1 | 8/2008 | Desai et al. |
| 2008/0208904 A1* | 8/2008 | Friedlander et al. ....... 707/104.1 |
| 2008/0320219 A1* | 12/2008 | Okada et al. ................. 711/114 |
| 2009/0112531 A1* | 4/2009 | Sato et al. ......................... 703/2 |
| 2009/0144393 A1* | 6/2009 | Kudo ........................... 709/218 |

FOREIGN PATENT DOCUMENTS

WO    WO 2007/115940    10/2007

* cited by examiner

FIG. 2

STATE OF USE INFORMATION — 107

| CI/Relationship ID | NUMBER OF TIMES OF MANIPULATION | ALTERATION DATE | ... |
|---|---|---|---|
| CI 1 | 100 | 2007.10.31 | |
| CI 2 | 150 | 2007.10.24 | |
| ... | ... | ... | |
| Rel 1 | 50 | 2006.01.01 | |
| Rel 2 | 10 | 2006.12.31 | |
| ... | ... | ... | |

FIG. 3

PROPERTY INFORMATION — 108

| CI/Relationship ID | NAME OF ATTRIBUTE | PROPERTY | MATCHING METHOD |
|---|---|---|---|
| CI 1 | MEMORY | MAXIMUM VALUE | — |
| CI 1 | HDD | MINIMUM VALUE | CALCULATION OF MINIMUM VALUE |
| CI 2 | LOAD | STATISTIC INFORMATION | CALCULATION OF AVERAGE VALUE |
| ... | ... | ... | ... |
| Rel 1 | WEIGHT | PRIORITY INFORMATION | MATCHING PROCEDURE 1 |
| ... | ... | ... | ... |

| MATCHING METHOD INFORMATION | |
|---|---|
| NAME OF MATCHING METHOD | MATCHING PROCEDURE |
| CALCULATION OF MINIMUM VALUE | DETERMINE MINIMUM VALUE FROM INFORMATION |
| CALCULATION OF AVERAGE VALUE | DETERMINE AVERAGE VALUE OF INFORMATION |
| ... | ... |
| MATCHING PROCEDURE 1 | CALL PROCEDURE 1 |
| ... | ... |

| DEGREE OF RELIABILITY SELECTION STANDARD | |
|---|---|
| STANDARD OF DEGREE OF RELIABILITY | PRIORITY |
| MATCHING TO OPERATION RESULT | 100 |
| PRESENCE OR ABSENCE OF OPERATION RESULT | 80 |
| NUMBER OF RELATED INFORMATION | 50 |
| NUMBER OF TIMES OF MANIPULATION | 30 |
| ALTERATION DATE | 20 |
| ... | ... |

FIG. 6

| OVERALL OPERATION RESULT INFORMATION | |
|---|---|
| NAME OF RESOURCE | ATTRIBUTE |
| SERVER 1 | name="aaa", ip="11.22.33.44", ... |
| SERVER 2 | name="bbb", ip="12.34.56.78", ... |
| ... | ... |
| ROUTER 1 | vender="Fujitsu" |
| ROUTER 2 | vender="XXX" |
| ... | ... |

111

INFORMATION PROCESSING APPARATUS

CROSS-REFERENCE TO RELATED APPLICATIONS

This application is based upon and claims the benefit of priority of the prior Japanese Patent Application No. 2008-059425, filed on Mar. 10, 2008, the entire contents of which are incorporated herein by reference.

FIELD

The embodiment discussed herein is related to an information processing apparatus, an information processing program, and an information processing method for managing attribute information as to resources constituting a system.

BACKGROUND

A database called an F-CMDB (Federated Configuration Management Database) is known. The F-CMDB manages all the information as to components of an information system by virtually integrating different types of databases which manage information.

As shown in FIG. 19, the F-CMDB enables a manipulation to be cross-sectionally executed to an arrangement information DB, an incident information DB, a trouble information DB, a release information DB, a change information DB, and an application information DB which are a plurality of virtually integrated databases. Each of the plurality of integrated databases manages CI (configuration item) which is attribute information about the resources that constitutes the system (equipment) and relationship between the information.

Further, as shown in FIG. 20, the F-CMDB has a reconciliation function. The reconciliation function adjusts information by managing the information of the same items, which are managed by a different name and a different local ID in each virtually integrated database, using a unique ID which can be commonly used for all the virtually integrated databases and integrating names.

However, when the information of the same CIs are integrated by the reconciliation function described above, there is a problem in that a plurality of information are registered as to the same CIs as well as a contradiction arises when the information, for example, the capacities of HDDs in the same CIs are different between the above information as shown in FIG. 21.

SUMMARY

According to an aspect of an embodiment of the invention, an information processing apparatus for managing attribute information as to resources constituting a system includes an acquisition unit which obtains a plurality of attribute information as to the same resources, a degree of reliability calculation unit which calculates, when a contradiction exists between the plurality of attribute information obtained by the acquisition unit, a degree of reliability as to each of the plurality of attribute information, and an attribute information determination unit which sets the attribute information, which has the highest degree of reliability calculated by the degree of reliability calculation unit, as attribute information as to the resources.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 2 is a view showing state of use information;

FIG. 3 is a view showing property information;

FIG. 4 is a view showing information of a matching method;

FIG. 5 is a view showing information of a degree of a reliability selection standard;

FIG. 6 is a view showing information of an overall operation result;

DESCRIPTION OF EMBODIMENT

Figure 1:
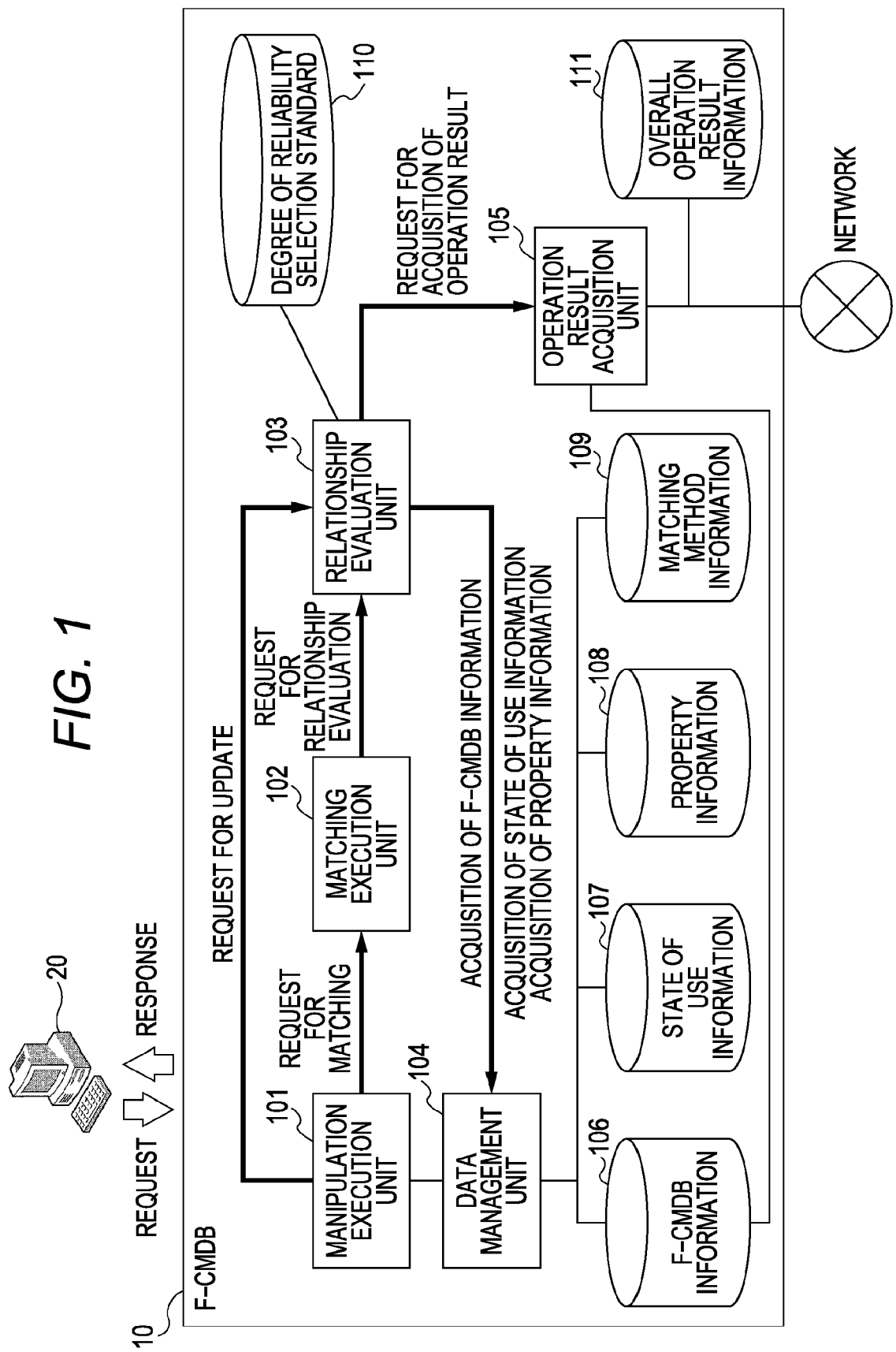
FIG. 1 is a block diagram showing an arrangement of an F-CMDB according to an embodiment.

An embodiment of the present invention will be explained below referring to the drawings.

First, an arrangement of an F-CMDB according to the embodiment will be explained. FIG. 1 is a block diagram showing the arrangement of the F-CMDB according to the embodiment.

The F-CMDB 10 has a manipulation execution unit 101 (acquisition unit), a matching execution unit 102, a reliability evaluation unit 103 (reliability calculation unit, statistic amount calculation unit, attribute information determination unit, selection unit), a data management unit 104, and an operation result acquisition unit 105. Further, the F-CMDB 10 is connected to a plurality of databases (not shown) for managing the information of items constituting a system through a network. The F-CMDB 10 integrates the information of the same items managed by a different local ID in these databases. Further, a terminal 20 requests F-CMDB information, which is information as to a system that is matched and arranged by the F-CMDB 10.

The manipulation execution unit 101 requests the matching execution unit 102 to make matching and requests the reliability evaluation unit 103 to update the F-CMDB information.

The matching execution unit 102 requests the reliability evaluation unit 103 to execute a reliability evaluation process to be described later.

The reliability evaluation unit 103 executes the reliability evaluation process based on a degree of reliability selection standard 110 to be described later.

The data management unit 104 manages F-CMDB information 106, which manages CI and Relationship registered or updated by a resource, state of use information 107, property information 108, and matching method information 109.

Further, the operation result acquisition unit 105 obtains overall operation result information 111 to be described later based on an operation result acquisition request from the reliability evaluation unit 103.

Next, the state of use information will be explained. FIG. 2 is a view showing the state of use information.

The state of use information 107 is information to which the following information is caused to correspond:

CI/Relationship ID, which includes local ID showing CI or Relationship (CI: CI1, CI2, . . . . , Relationship: Rel1, Rel2, . . . );

the number of times of manipulation, which is the number of times at which CI or Relationship is referred to; and a update date, which is a date on which CI or Relationship is changed.

Note that it is assumed that the number of times of use and the update date are managed in the respective databases managed by the F-CMDB 10, and that the data management unit 104 obtains these information items through the operation result acquisition unit 105.

Next, the property information will be explained. FIG. 3 is a view showing the property information.

The property information 108 is information to which the following information items are caused to correspond:

CI/Relationship ID;

an attribute name showing the attribute of CI or Relationship;

a property of the attribute (determination standard for determining a numerical value in the attribute); and a specific matching method.

Next, the matching method information will be explained. FIG. 4 is a view showing the matching method information.

Further, the matching method information 109 is information to which the following information is caused to correspond:

matching method names which are the names added to respective matching methods; and matching procedures which are the specific procedures of the matching methods.

Note that although the matching procedure is described by a natural language in FIG. 4 for the purpose of explanation, an actually described language is a language which can be interpreted by the F-CMDB 10. Further, although it is described in the matching procedure that "procedure 1 is called", this shows a call for a predetermined procedure (program).

Further, in the matching method in the property information 108, when a logic function, which is previously assembled to the F-CMDB 10, is executed, it is shown by "-" and when the matching method information 109 is referred to, a matching method name in the matching method information 109 is described.

Next, the degree of reliability selection standard 110 will be explained. FIG. 5 is a view showing the degree of reliability selection standard.

The degree of reliability selection standard 110 is information in which a degree of reliability standard is caused to correspond to the priority of the standard. The degree of reliability standard is a rule to decide which "is right" among two information (CI or Relationship). The priority of the standard is the reliability of the rule (that is to say, priority). Although the degree of reliability standard includes matching to an operation result to be described later, presence or absence of an operation result, the number of related information (the number of Relationships), the number of times of manipulation, a update date, and the like, any degree of reliability standards other than the above standards may be provided. A priority is set to each of these standards of degree of reliability, and it is assumed in the embodiment that a standard having a larger value has a higher priority. Further, although this point is added by the reliability evaluation unit 103 when it satisfies a predetermined condition, this will be described later.

Next, the overall operation result information 111 will be explained. FIG. 6 is a view showing overall operation result information.

In the overall operation result information 111, resource names, which are the names of the resources constituting the system, are caused to correspond to the attributes of the resources. The overall operation result information 111 is used when "the matching to the operation result" and "the presence or absence of the operation result" are judged and may be previously prepared or created using any tool. Further, the resource names in the overall operation result information 111 are the names on the system, and the attributes corresponding to the respective resource names are the real device information of the devices themselves as the resources of the system managed by the F-CMDB 10. Specifically, the resource names are the names of the devices, IP addresses, vendors, and the like.

Figure 7:
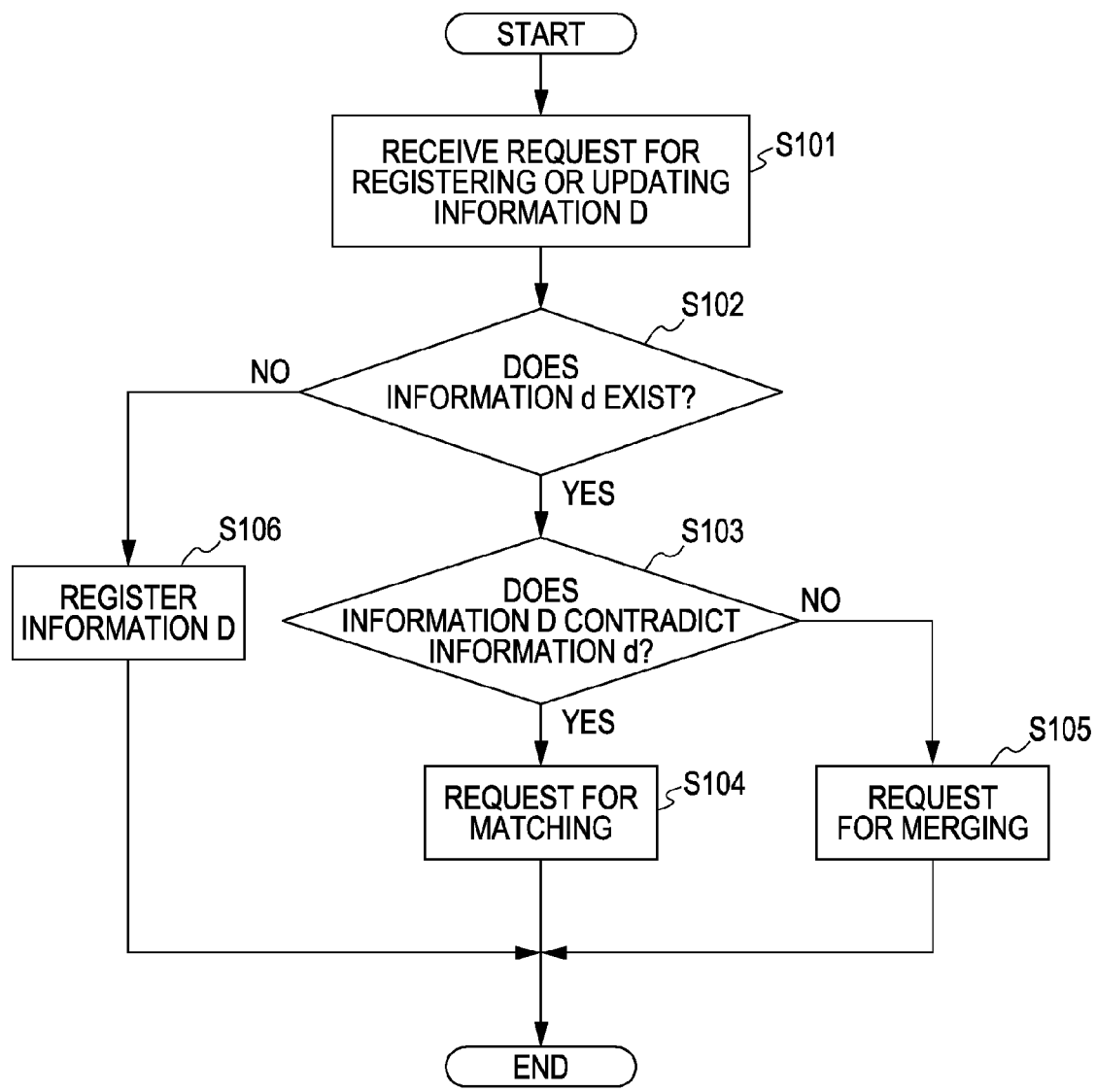
FIG. 7 is a flowchart showing an operation of a manipulation execution unit.

Next, an operation of the F-CMDB according to the present embodiment will be explained. FIG. 7 is a flowchart showing an operation of the manipulation execution unit.

First, when the manipulation execution unit 101 receives a request for registering or updating information D, for example CI of a resource A (S101), it determines whether or not information d, which is CI, exists in the same resource A as that of the information D in the F-CMDB information 106 (S102).

When the information d exists in the F-CMDB information 106 (S102, YES), the manipulation execution unit 101 determines whether or not the information D contradicts the information d (S103).

When the information D contradicts the information d (S103, YES), the manipulation execution unit 101 requests the matching execution unit 102 to solve the contradiction between the information D and the information d (S104).

In contrast, when the information D does not contradict the information d (S103, NO), the manipulation execution unit 101 requests the matching execution unit 102 to merge the information D with the information d (S105).

Further, when it is determined at step S102 that the information d does not exist in the F-CMDB information 106 (S102, NO), the manipulation execution unit 101 registers the information D to the F-CMDB information 106 as CI of the resource A through the data management unit 104 (S106).

As described above, when a contradiction exists between the already existing information d and the information D, which is new information as to the same resource as that of the information d, the manipulation execution unit 101 executes matching to solve the contradiction. Note that when the matching execution unit 102 receives a request for merging, it integrates the information D and the information d, and when the matching execution unit 102 receives a request for matching, it requests the reliability evaluation unit 103 to execute the reliability evaluation process.

Figure 8:
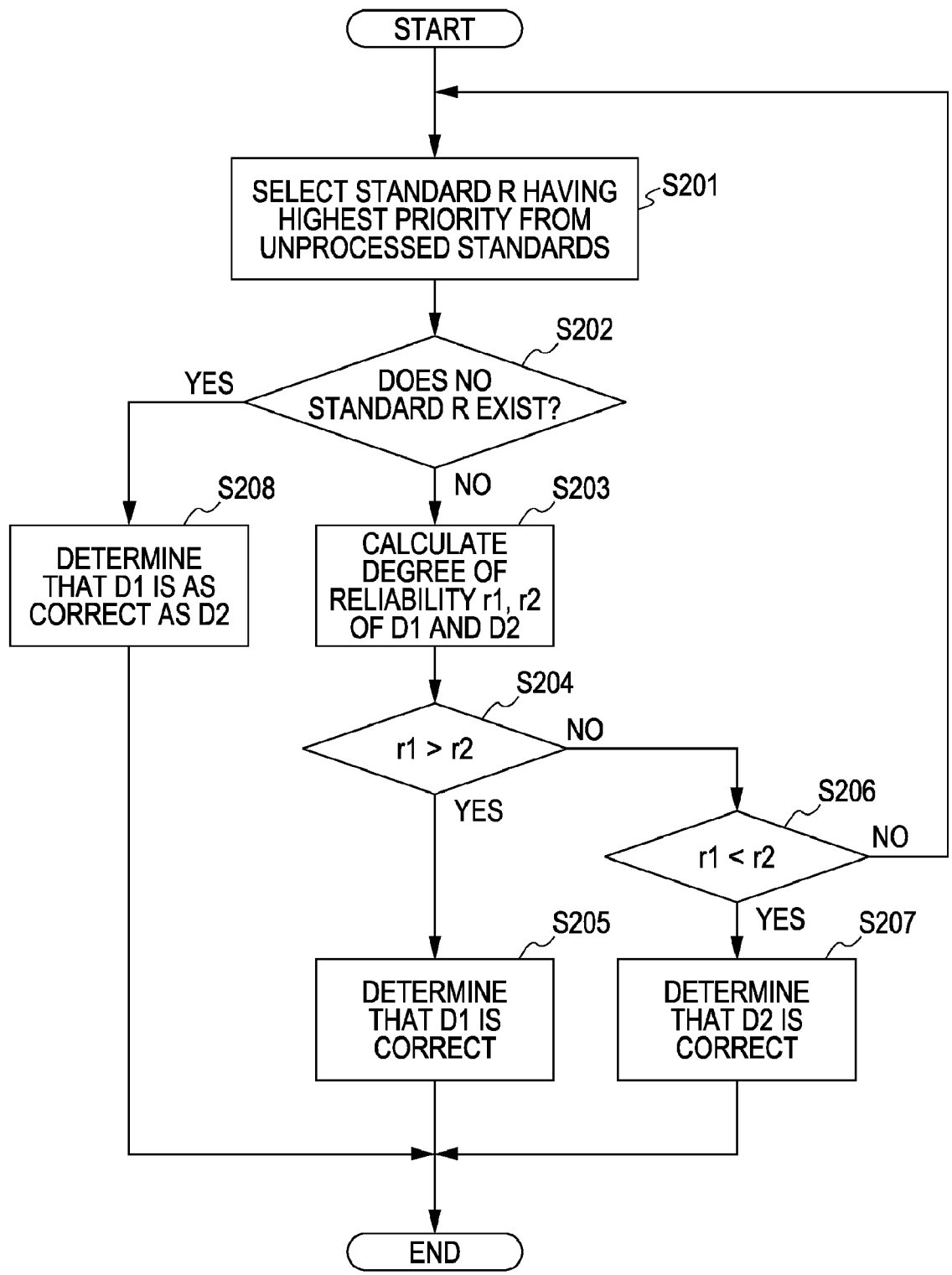
FIG. 8 is a flowchart showing an operation of a relationship evaluation process.

FIG. 8 is a flowchart showing an operation of the reliability evaluation process. It is assumed in FIG. 8 that the reliability evaluation unit has already requested execution of the reliability evaluation process. Further, although the number of CIs to be compared is set to two pieces D1 and D2 for the purpose of explanation, any number of CIs may be set as the objects to be compared.

First, the reliability evaluation unit 103, which receives the request for the reliability evaluation, selects a standard R having the highest priority value of the unprocessed standards of degree of reliability in the degree of reliability selection standard 110 (FIG. 5) (S201) and determines whether or not the standard R exists, that is, whether or not a selection standard to be selected does not exist (S202).

When the selection standard to be selected exists (S202, NO), the reliability evaluation unit 103 calculates the degree of reliability r1 of D1 and the degree of reliability r2 of D2 respectively, based on the standard R determined at step S201 (S203), and judges whether r1 is larger than r2 (S204).

When r1 is larger than r2 (S204, YES), the reliability evaluation unit 103 determines that D1 is correct (S205).

In contrast, when the r1 is equal to or smaller than the r2 (S204, NO), the reliability evaluation unit 103 determines whether the r1 is smaller than the r2 (S206).

When the r1 is smaller than the r2 (S206, YES), the reliability evaluation unit 103 determines that D2 is correct (S207).

In contrast, when the r1 is equal to or larger than the r2 (S206, NO), since r1≧r2 as well as r1≦r2, that is r1=r2, the reliability evaluation unit 103 selects a standard R which has the highest priority value of the unprocessed standards of degree of reliability in the degree of reliability selection standard 110 again (S201).

Further, when no selection standard to be selected exists in the determination at step S202 (S202: YES), that is, r1=r2 is established in all the standards in the degree of reliability selection standards, the reliability evaluation unit 103 determines that D1 is as correct as D2 (S208).

As described above, the reliability evaluation unit 103 compares the degrees of reliability of two CIs (D1, D2) between which a contradiction exists from a standard having a high degree of priority in the degree of reliability selection standard 110. When they have the same degree of reliability, the reliability evaluation unit 103 compares the CIs by a standard having a next highest priority. The comparison may be performed as to attributes which contradict each other in CIs (for example, the capacity and the amount of memory of the HDD). Further, when D1 is as correct as D2, a user is informed that D1 and D2 cannot be matched or they are matched by another matching method. The other matching method will be described later.

Note that the priority is not fixed at all times and is updated by the reliability evaluation unit 103 with a result that the priority of the standard of degree of reliability is changed.

Figure 9:
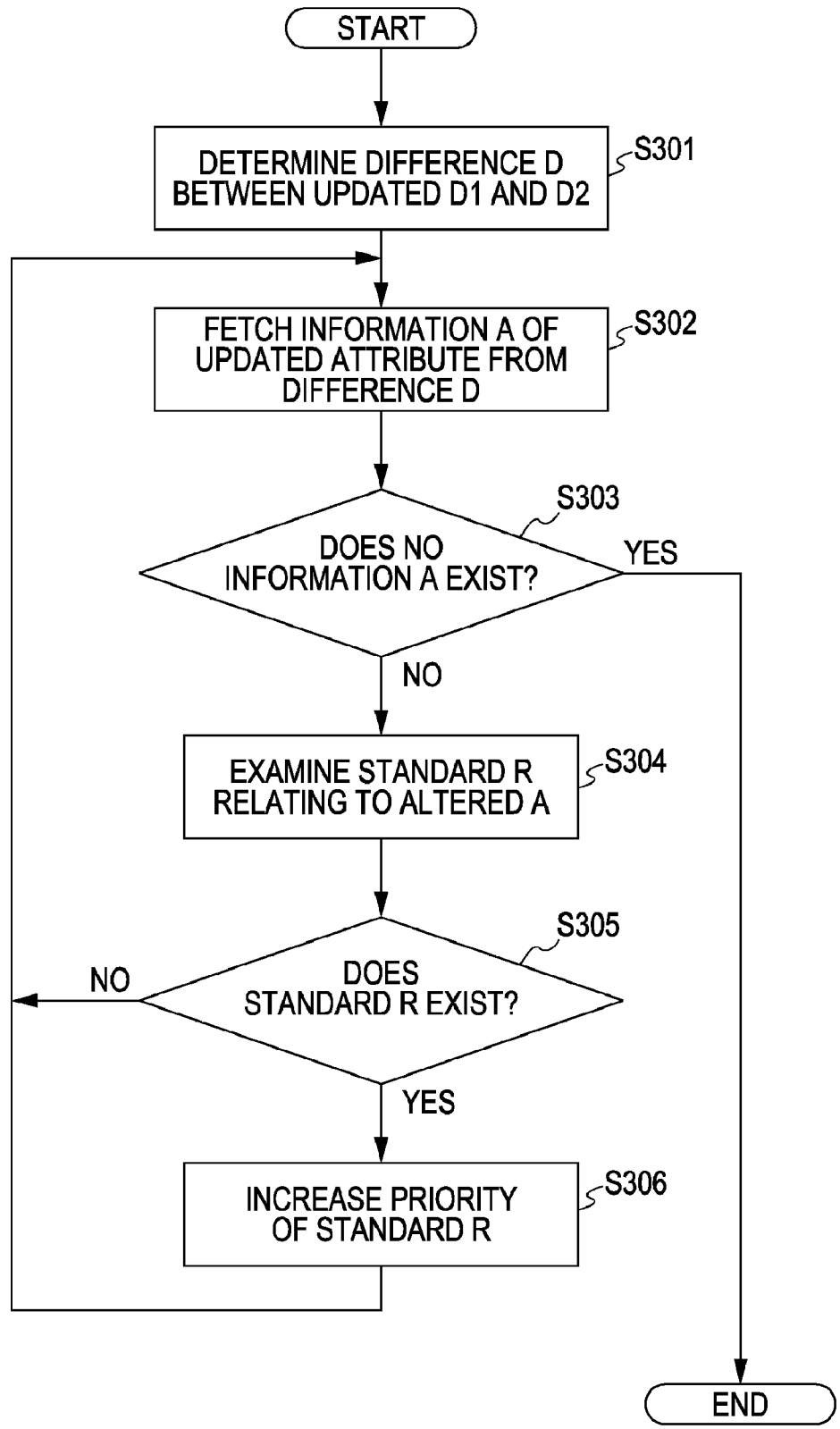
FIG. 9 is a flowchart explaining an operation of a priority update process.
Figure 10:
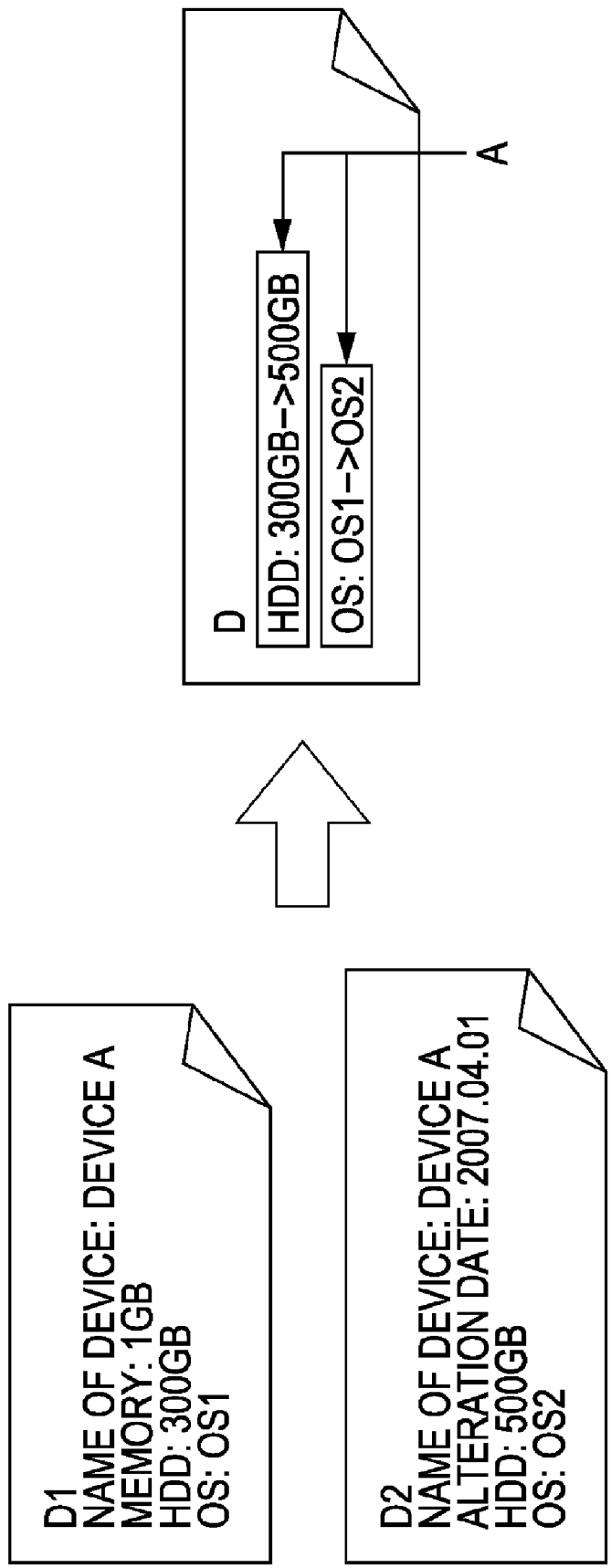
FIG. 10 is a view showing a difference of CI according to a priority update process and the attribute thereof.

FIG. 9 is a flowchart explaining an operation of a priority update process. Further, FIG. 10 is a view showing the difference of CIs subjected to the priority update process and the attribute thereof.

First, the reliability evaluation unit 103 determines the difference D of updated D1 and D2 (S301) and sequentially fetches the information A of the updated attributes from the determined difference D one by one (S302). Specifically, when the capacity of the HDD and OS are changed from the attribute of D1 to the attribute of D2 because D1 is matched with D2 as shown in FIG. 10, the HDD changed from 300 GB to 500 GB and the OS changed from OS 1 to OS 2 correspond to the information A, respectively.

Next, the reliability evaluation unit 103 determines whether or not the information A exists in the difference D (S303).

When the information A exists in the difference D (S303, NO), the reliability evaluation unit 103 examines a standard R relating to the change of the information A (S304) and determines whether or not the standard R exists (S305).

When the standard R exists (S305, YES), the reliability evaluation unit 103 increases the priority of the standard R relating to the change of the information A (S306), and sequentially fetches the information A of the updated attributes again from the difference D one by one (S302).

In contrast, when the standard R does not exist (S305, NO), the reliability evaluation unit 103 sequentially fetches the information A of the updated attributes again from the difference D one by one (S302).

Further, when it is determined at step S303 that the information A does not exist in the difference D (S303, YES), the reliability evaluation unit 103 finishes the priority update process.

As described above, the contradiction can be solved based on a standard having a higher degree of reliability of the matching standards for solving the contradiction by updating the priority of the degree of reliability selection standard 110.

Figure 11:
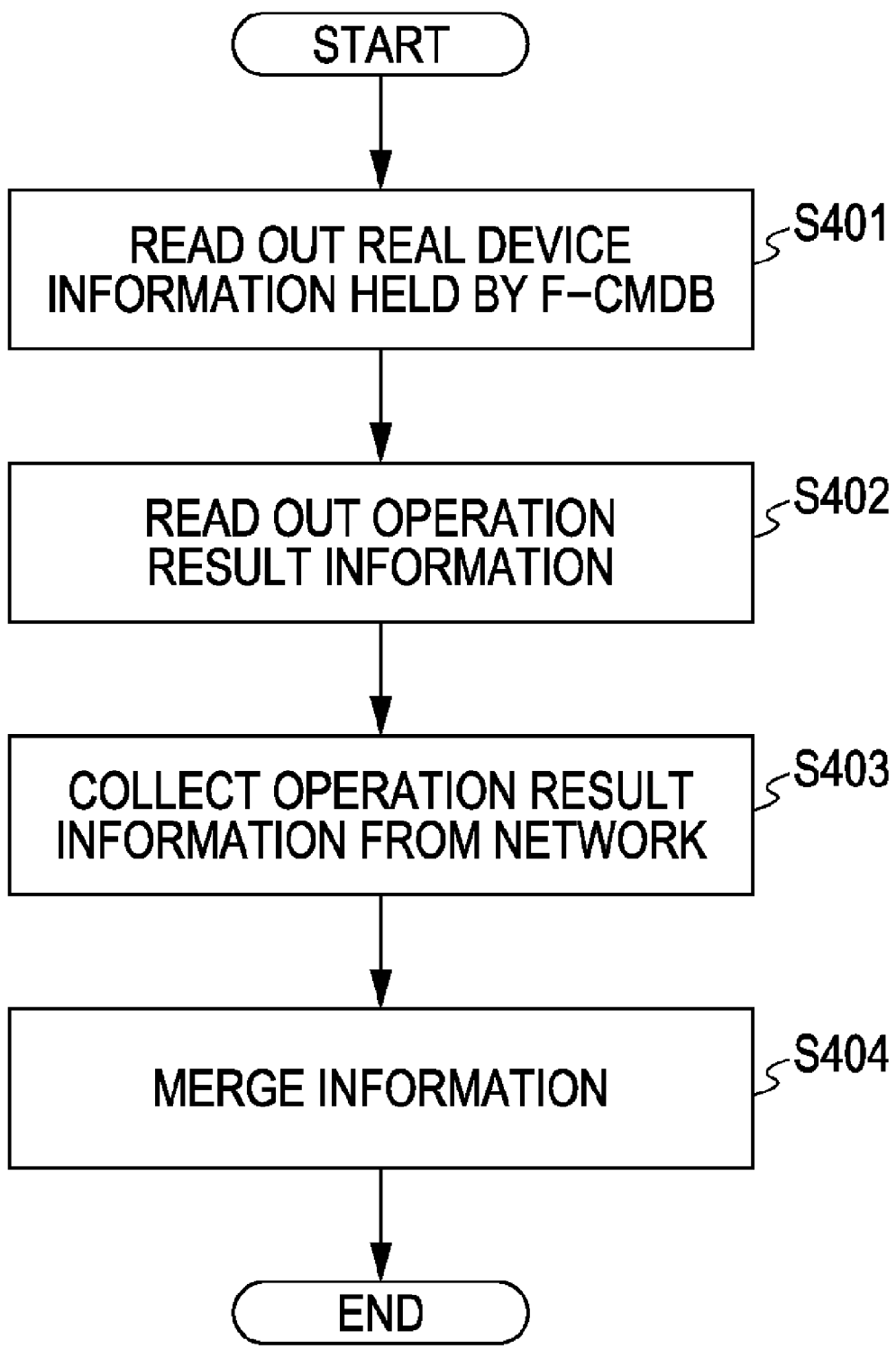
FIG. 11 is a flowchart showing an operation of an operation result acquisition process.

Next, the standard of the degree of reliability selection standard 110 will be explained. As shown in FIG. 5, the standard of degree of reliability includes "the matching to the operation result", "the presence or absence of operation result", "the number of related information", "the number of times of manipulation", and "the alteration date". First, "the matching to the operation result" and "the presence or absence of the operation result" in these standards of degree of reliability will be explained. FIG. 11 is a flowchart showing an operation of the operation result acquisition process.

When "the matching to the operation result" is selected from the degree of reliability selection standard 110 as the standard of degree of reliability at step S201 of the reliability evaluation process, the reliability evaluation unit 103 requests the operation result acquisition unit 105 to obtain an operation result. The operation result acquisition unit 105, which receives the request for obtaining the operation result, reads out the real device information held by the F-CMDB 10 first (S401) reads out operation result information as to the resource from the overall operation result information 111 (S402) collects the operation result information as to the resource from the network using, for example, a protocol such as SNMP (Simple Network Management Protocol) (S403) and then merges the real device information with the operation result information (S404).

Note that the operation result information as the merged result may be stored in the overall operation result information 111 again. Further, the operation result information may be obtained by any method without executing steps S401 to S403 at all. Further, when the operation result information can not be obtained by a process having a high priority by adding a priority to the processes at steps S401 to S403, the operation result information may be obtained by a process having the next highest priority.

The reliability evaluation unit 103 judges "the matching to the operation result" and "the presence or absence of the operation result" based on the operation result information obtained as described above.

Figure 12:
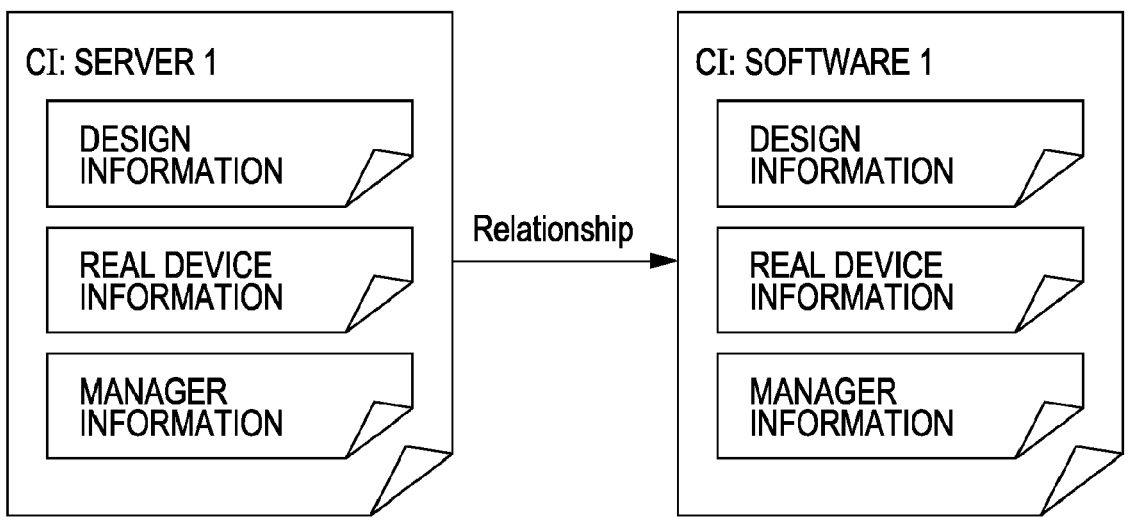
FIG. 12 is a view showing CI having a standard arrangement and the relationship thereof.
Figure 13:
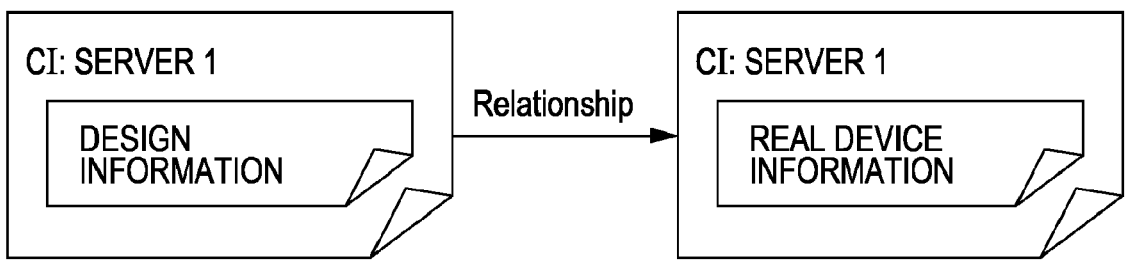
FIG. 13 is a view showing CI having a non-standard arrangement and the relationship thereof.

When the degree of reliability is determined based on "the matching to the operation result", if "CI: a server 1" in FIG. 12 is CI whose degree of reliability has been determined, it is assumed that a higher degree of reliability can be obtained when the real device information of "CI: the server 1" is better matched to the attribute corresponding to the server 1 in the overall operation result information 111 (FIG. 6) (for example, a name agrees with an IP address). Further, when the CI whose degree of reliability has been determined is the "CI: the server 1" which has the non-standard arrangement as shown in FIG. 13, the degree of reliability is determined depending on how much the real device information of the related "CI: the server 1" is matched to the attribute corresponding to the server 1 in the overall operation result information 111. Further, it is assumed that when the real device information of "CI: software 1" related to "CI: server 1" is better matched with the real device information (not shown) of the software 1 in the overall operation result information 111, the degree of reliability is higher.

Figure 14:
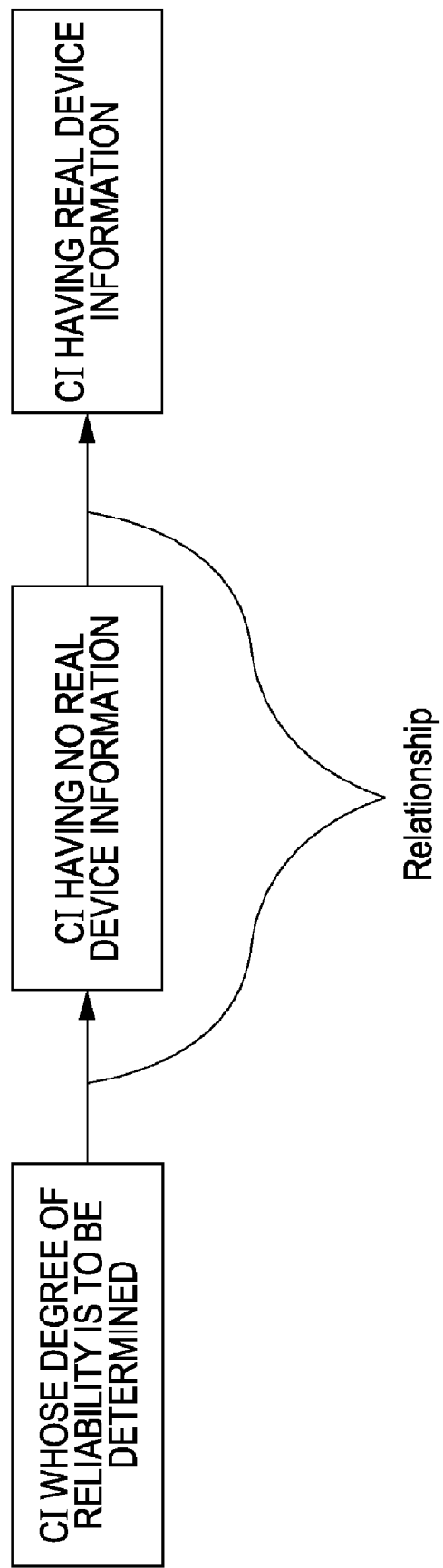
FIG. 14 is a view showing an indirect relation in the F-CMDB.

Note that when the degree of reliability is determined based on these standards of degree of reliability, the CI, which is related to the CI whose degree of reliability has been determined, need not to be directly related thereto and may be CI related to CI which is related as shown in, for example FIG. 14, that is, may be indirectly related CI.

Figure 15:
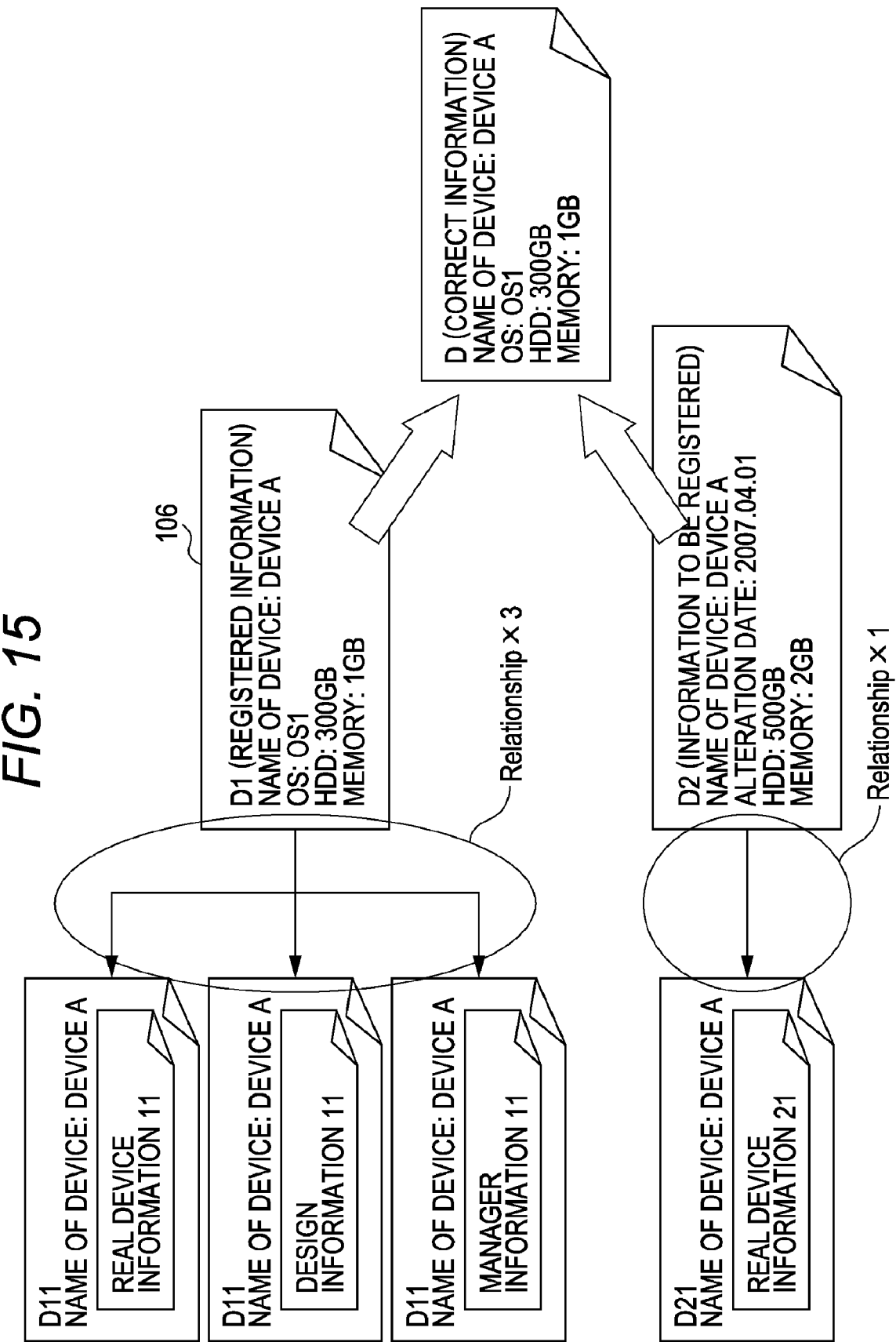
FIG. 15 is a view showing the number of information related to CI.

Next, "the number of related information" as the standard of degree of reliability will be explained. FIG. 15 is a view showing the number of information related to CI.

Further, when the degree of reliability is determined based on "the number of related information", the reliability evaluation unit 103 compares the amount of information (the number of Relationships) related to the D1, which is the CI already registered to the F-CMDB information 106, with the number of Relationships of the D2 (which is the newly registered CI), and employs the CI having a larger number of them as correct information, as shown in FIG. 15.

Figure 16:
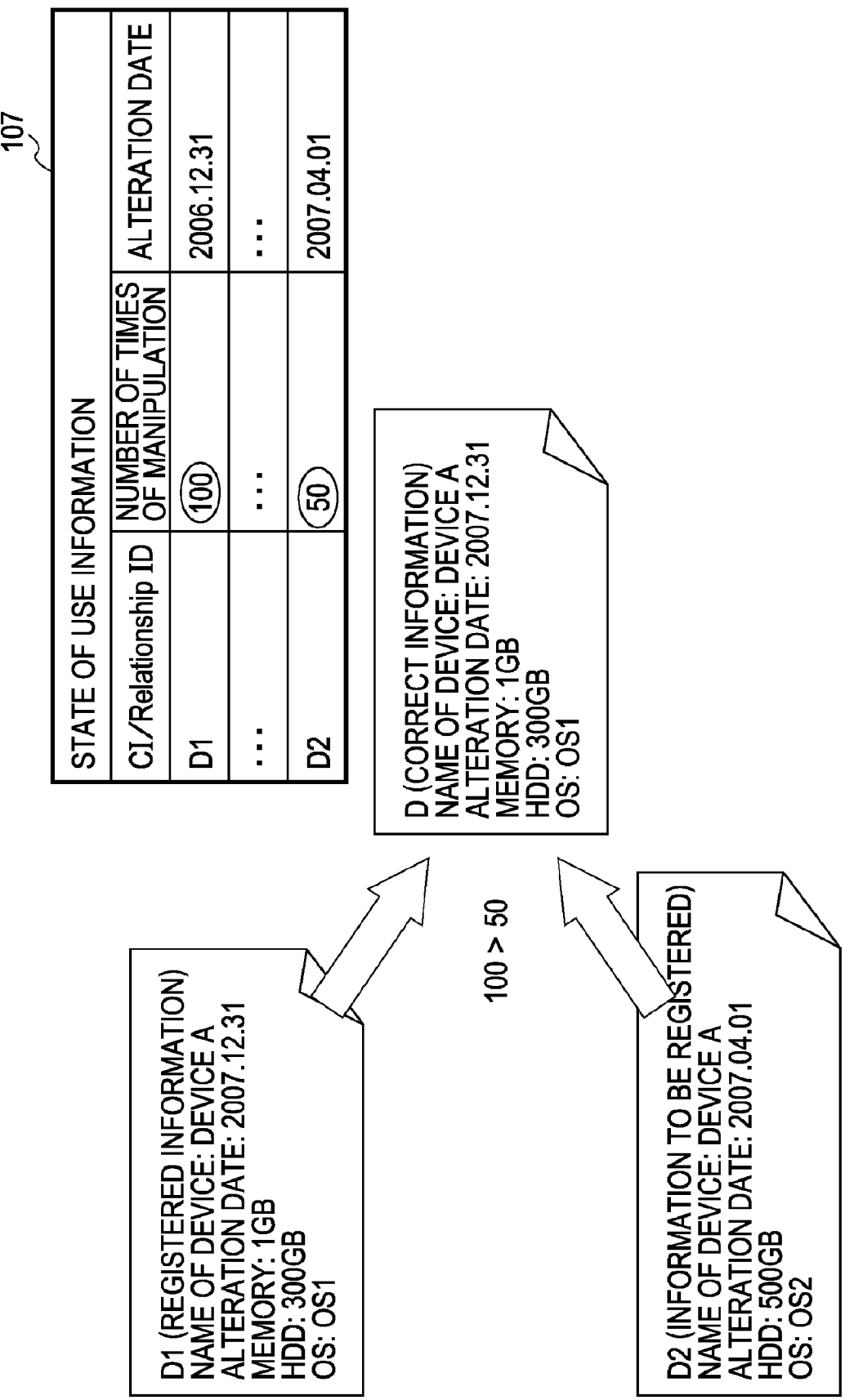
FIG. 16 is a view showing CI that is altered based on the number of manipulations.

Next, "the number of times of manipulation" and "the updated date" as the standard of degree of reliability will be explained. FIG. 16 is a view showing CI altered based on the number of times of operation.

When the degree of reliability is determined based on "the number of times of manipulation", the reliability evaluation unit 103 refers to the state of use information 107 managed by the data management unit 104, compares the number of times of manipulation of the D1, which is the CI already registered to the F-CMDB 106, with that of the D2, which is newly registered CI in the state of use information 107, and employs the CI having a larger number of manipulations as correct information, as shown in FIG. 16. This standard is effective in a system in which CI (which is manipulated, that is, referred to a larger number of times) has a higher probability that it is correct information.

Further, when the degree of reliability is determined based on "the updated date" and when the degree of reliability is determined based on "the number of times of manipulation", the reliability evaluation unit 103 refers to the state of use information 107 managed by the data management unit 104, compares the updated date of the D1, which is the CI already registered to the F-CMDB information 106, with that of the D2, which is newly registered CI in the state of use information 107, and employs the CI having the new updated date as correct information. This standard is effective in a system in which newer information has a high probability that it is correct information. Further, a system, in which newer information has a low probability that it is correct information, may be arranged such that the CI, which is manipulated a larger number of times as well as is older, has a higher degree of reliability, in addition to the number of times of manipulation. This is because when information is not updated regardless of whether it has been referred to (manipulated), it has a higher probability that it is correct information.

Figure 17:
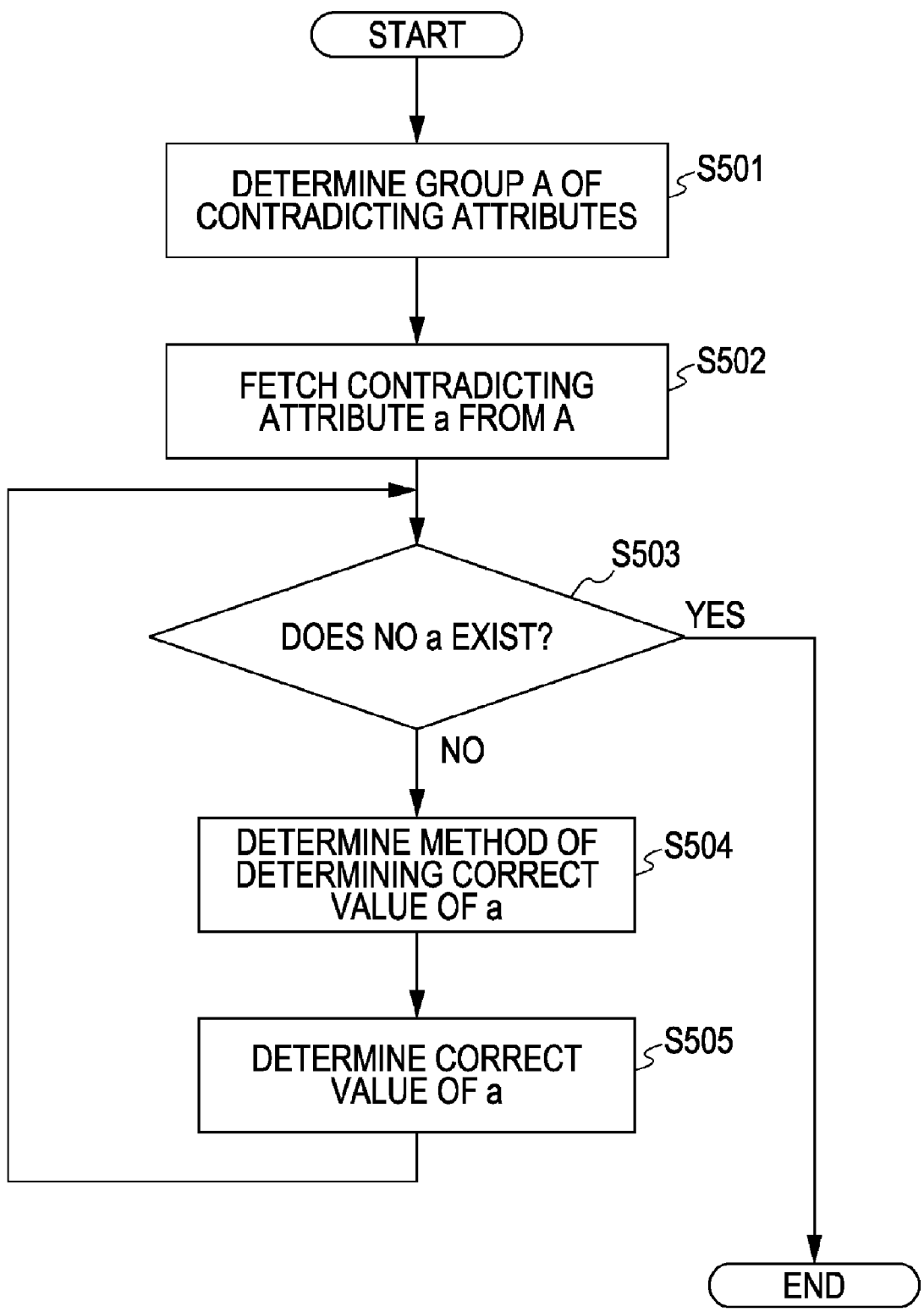
FIG. 17 is a flowchart showing an operation of a property evaluation process.

Matching based on the degree of reliability of the CIs which contradict each other has been explained above. The reliability evaluation unit 103 also matches the CIs based on the property of attribute of the property information 108 (FIG. 3). Next, a property evaluation process executed by the reliability evaluation unit 103 will be explained. FIG. 17 is a flowchart showing an operation of the property evaluation process. It is assumed in FIG. 17 that the reliability evaluation unit 103 received a reliability evaluation request from the matching execution unit 102.

First, the reliability evaluation unit 103 determines a group A of attributes which contradict each other in different CIs (S501), fetches contradict attribute a from the group A (S502), and determines whether or not the attribute a exists (S503).

When the attribute a exists (S503, NO), the reliability evaluation unit 103 refers to the property information 108, determines a method of determining the correct values of the attribute a (S504), refers to a matching method information, determines the correct values of the attribute a by a matching procedure corresponding to a matching method corresponding to the method of determining the correct values (S505), and determines whether or not the attribute a exists again (S503).

In contrast, when the attribute a does not exist, (S503, YES), the reliability evaluation unit 103 finishes the property evaluation process.

Figure 18:
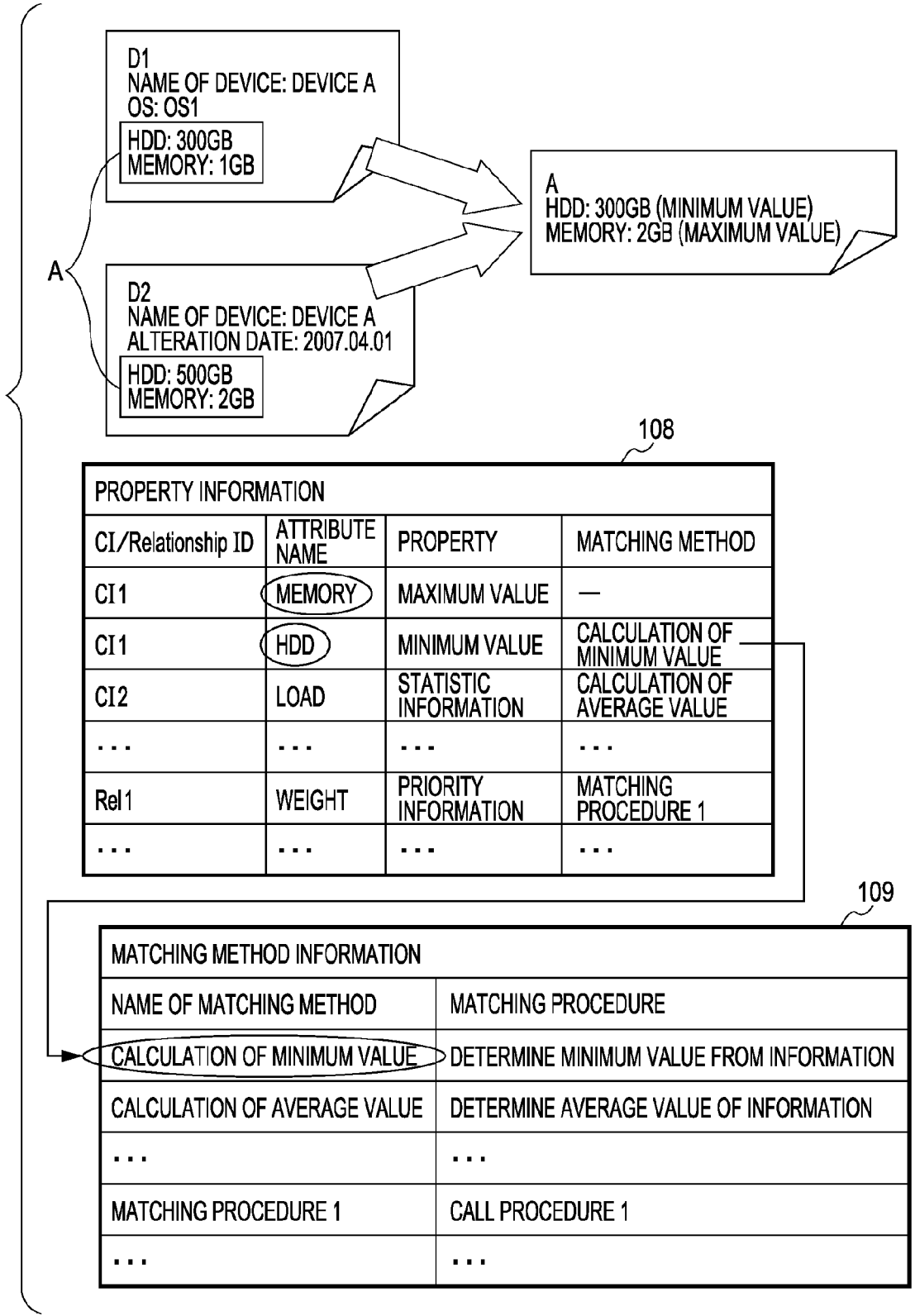
FIG. 18 is a view showing a specific example of the property evaluation process.
Figure 19:
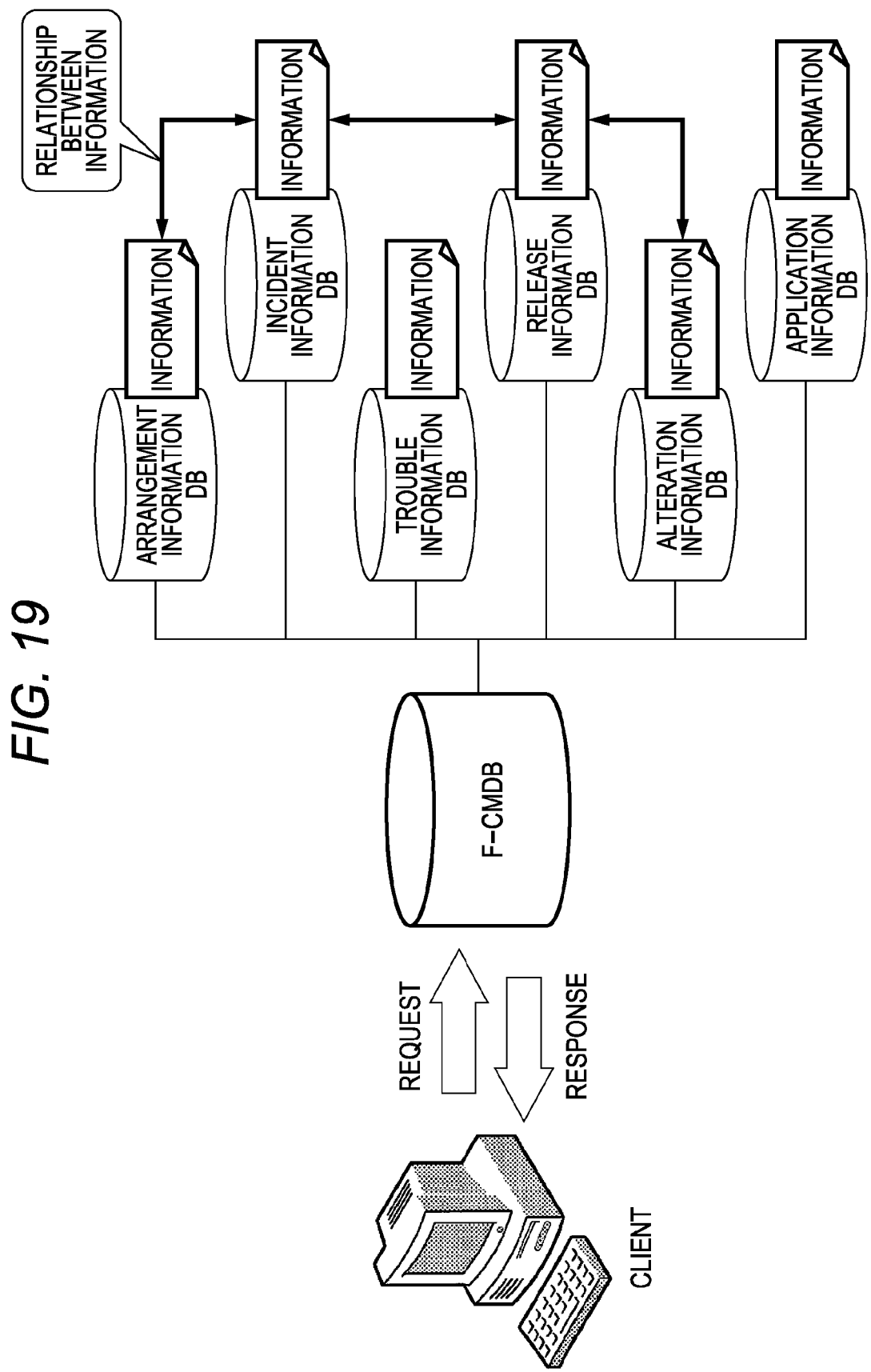
FIG. 19 is a view showing a conventional F-CMDB.
Figure 20:
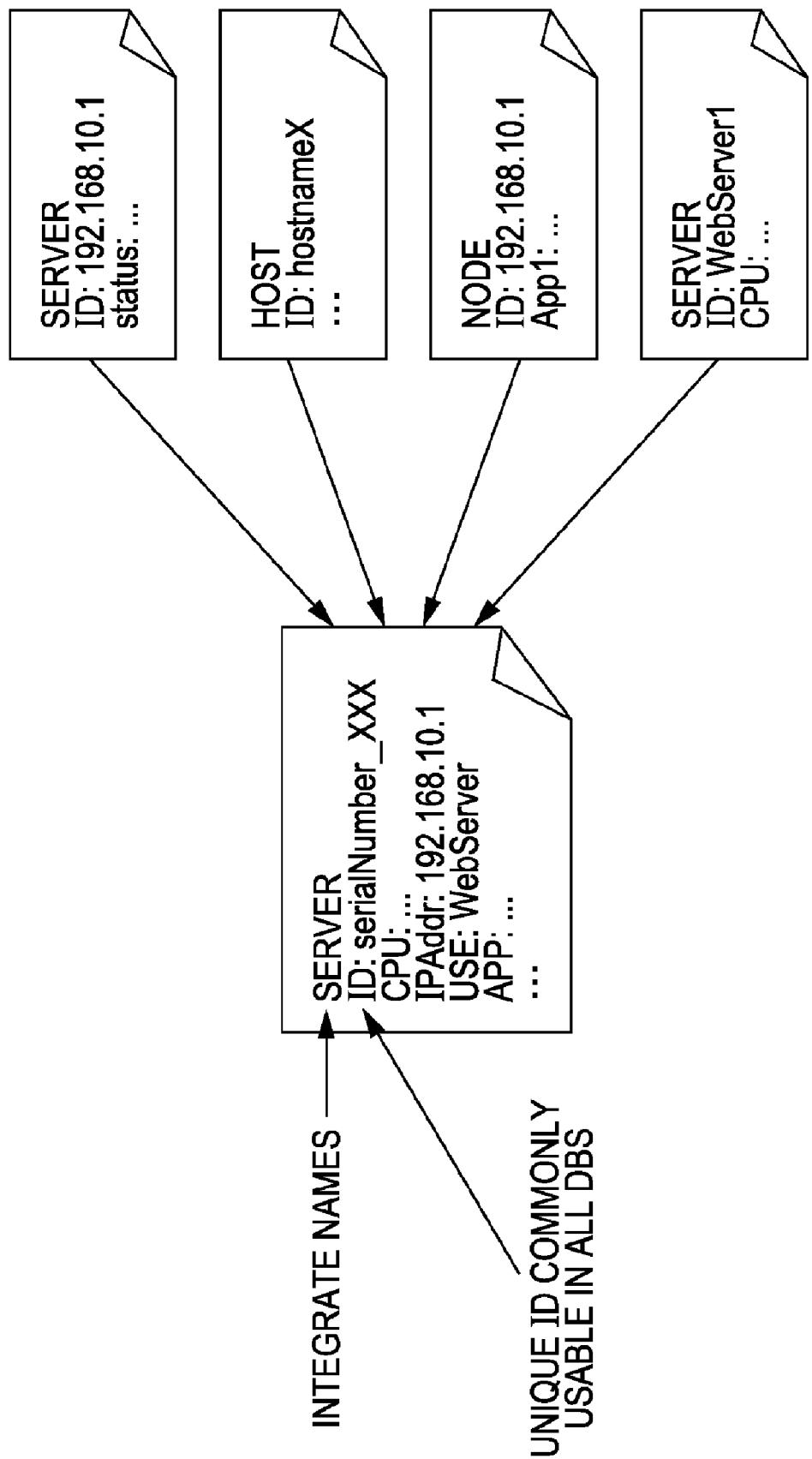
FIG. 20 is a view showing a reconciliation function.
Figure 21:
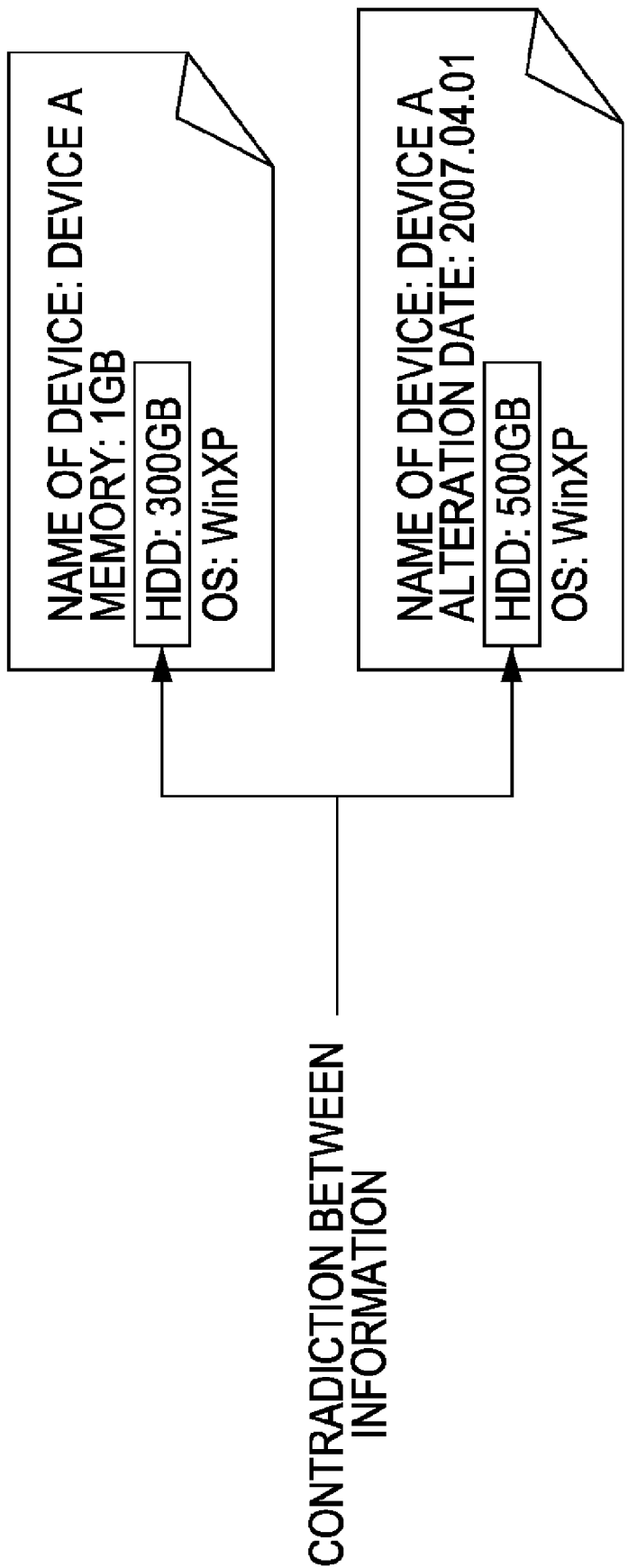
FIG. 21 is a view showing a problem in a conventional reconciliation function.

Note that FIG. 18 specifically explains the process described above. FIG. 18 is a view showing a specific example of the property evaluation process.

When CIs which contradict each other exist, the reliability evaluation unit 103 selects HDDs and Memories as the group A of the attributes which contradict each other, refers to the property information 108, determines calculation of a minimum value as the matching method of the HDD, and executes a matching procedure corresponding to the calculation of the minimum value of the "HDD: 300 GB" and the "HDD: 500 GB," by referring to the matching method information 109. Further, the reliability evaluation unit 103 refers to the property information 108 again and calculates the maximum values of Memory: 1 GB and Memory: 2 GB by a logic function previously assembled by the system because the matching method of Memories is "-". It means matching procedure is not specified.

The reliability evaluation unit 103 calculates more correct values by the property previously set to the attributes as described above. The process may be executed before or after the reliability evaluation process. Further, the reliability evaluation unit 103 may use any of the reliability evaluation process and the property evaluation process, depending on an attribute when the contradiction in a plurality of CIs is solved. For example, since a correct value must be determined as to the type of OS by the reliability evaluation process and a peak load, a maximum power consumption, and the like must be derived from the values of a plurality of CIs, correct values are calculated by the property evaluation process so that the reliability evaluation unit 103 can employ information having a high probability as correct information in all the attributes included in the CIs.

A program implementing the embodiments may be recorded on computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An information processing apparatus of an Federated Configuration Management database for managing attribute information of hardware or software application resources constituting a computer system, the information processing apparatus comprising a processor to execute a process including:
   obtaining a plurality of attribute information of the same hardware and software application resources;
   calculating, when a contradiction exists among the plurality of attribute information obtained by the acquisition unit, a degree of reliability for each of the plurality of attribute information; and
   setting the attribute information, which has a highest degree of reliability calculated by the calculating procedure, to be the attribute information of the hardware and software application resources,
   wherein the processor sets a plurality of processes for calculating a degree of reliability, adds a priority to each of the plurality of processes, and calculates the degree of reliability by a process to which the highest priority is added in the plurality of processes and where as long as the processor, using the highest priority process of the plurality of processes, calculates a plurality of contradictory attribute information as being equally reliable, that highest priority process is removed from the plurality of processes and the reliability is recalculated, whereas when the plurality of contradictory attribute information do not have the same level of reliability, the processor changes the priority of the process that calculated the degree of reliability.

2. The information processing apparatus according to claim 1, wherein the processor calculates, when a contradiction exists among the plurality of attribute information, a statistic amount of the plurality of attribute information based on the attribute of the attribute information, wherein the processor determines the statistic amount of the attribute information of the hardware and software application resources.

3. The information processing apparatus according to claim 1, wherein the plurality of processes include a process for calculating a matching property of fixed attribute information as the degree of reliability of the attribute information whose degree of reliability is being calculated.

4. The information processing apparatus according to claim 1, wherein the attribute information is related to other attribute information, and
   the plurality of processes include a process for calculating a number of the attribute information related to the attribute information whose degree of reliability is being calculated as the degree of reliability.

5. The information processing apparatus of claim 1, wherein the degree of reliability is calculated based on at least one of an updated date of the attribute information, a number indicating how many times the attribute information is referred to, a number indicating how many relationships the attribute information has, or a degree of matching with operation result information of the hardware or software application.

6. The information processing apparatus according to claim 2, wherein the processor selects either calculation of the degree of reliability executed by the processor or calculation of the statistic amount executed by the processor based on the attribute of the attribute information.

7. A non-transitory computer readable recording medium recording an information processing program causing a computer to execute a process comprising:
   obtaining a plurality of attribute information regarding resources of the computer;
   calculating, when a contradiction exists among the plurality of attribute information, a degree of reliability for each of the plurality of attribute information; and
   determining the attribute information, which has a highest degree of reliability, as the attribute information of the resources,
   wherein the calculating sets a plurality of processes for calculating the degree of reliability, adds a priority to each of the plurality of processes, and calculates the degree of reliability by a process to which the highest priority process is added in the plurality of processes, and where as long as the reliability calculation unit, using the highest priority process of the plurality of processes, calculates a plurality of contradictory attribute information as being equally reliable, that highest priority process is removed from the plurality of processes and the reliability is recalculated, whereas when the plurality of contradictory attribute information do not have the same level of reliability, the degree of reliability calculation unit changes the priority of the process that calculated the degree of reliability.

8. The computer readable recording medium recording an information processing program according to claim 7, the process further comprising
   calculating, when a contradiction exists between the plurality of attribute information, a statistic amount of the plurality of attribute information based on the attribute of the attribute information,
   wherein the determining determines the statistic amount as the attribute information of the resources.

9. The computer readable recording medium recording an information processing program according to claim 7, wherein the plurality of processes include a process for calculating a matching property of fixed attribute information as the degree of reliability of the attribute information whose degree of reliability is being calculated.

10. The computer readable recording medium recording an information processing program according to claim 7, wherein the attribute information is related to other attribute information, and
   the plurality of processes include a process for calculating a number of the attribute information related to the attribute information whose degree of reliability is being calculated as the degree of reliability.

11. The computer readable recording medium recording an information processing program according to claim 7, wherein the degree of reliability is calculated based on at least one of an updated date of the attribute information, a number indicating how many times the attribute information is referred to, a number indicating how many relationships the attribute information has, or a degree of matching with operation result information of the hardware or software application.

12. The computer readable recording medium recording an information processing program according to claim 8, further comprising selecting either calculating the degree of reliability or calculating the statistic amount based on the attribute of the attribute information.

13. An information processing method of managing attribute information of hardware and software application resources of a computer system, comprising:
   obtaining, by a computer processor, a plurality of attribute information of the same resources;
   calculating, by the computer processor, when a contradiction exists among the plurality of attribute information, a degree of reliability for each of the plurality of attribute information; and
   determining the attribute information which has a highest degree of reliability to be the attribute information of the resources,
   wherein the calculating sets a plurality of processes for calculating the degree of reliability, adds a priority to each of the plurality of processes, and calculates the degree of reliability by a process to which the highest priority process is added in the plurality of processes, and where as long as the reliability calculation unit, using the highest priority process of the plurality of processes, calculates a plurality of contradictory attribute information as being equally reliable, that highest priority process is removed from the plurality of processes and the reliability is recalculated, whereas when the plurality of contradictory attribute information do not have the same level of reliability, the degree of reliability calculation unit changes the priority of the process that calculated the degree of reliability.

14. The information processing method according to claim 13, further comprising
   calculating, when a contradiction exists among the plurality of attribute information, a statistic amount of the plurality of attribute information based on an attribute of the attribute information,
   wherein the determining determines the statistic amount of the attribute information of the hardware and software application resources.

15. The information processing method according to claim 13, wherein the plurality of processes include a process for calculating a matching property of fixed attribute information as the degree of reliability of the attribute information whose degree of reliability is being calculated.

16. The information processing method according to claim 13, wherein the attribute information is related to other attribute information, and
   the plurality of processes include a process for calculating a number of the attribute information related to the attribute information whose degree of reliability is being calculated as the degree of reliability.

17. The information processing method according to claim 13, wherein the degree of reliability is calculated based on at least one of an updated date of the attribute information, a number indicating how many times the attribute information is referred to, a number indicating how many relationships the attribute information has, or a degree of matching with operation result information of the hardware or software application.

* * * * *